(12) United States Patent
Dhavaloganathan

(10) Patent No.: US 9,451,076 B2
(45) Date of Patent: Sep. 20, 2016

(54) METHODS AND DEVICES FOR ADJUSTING SENSITIVITY OF PROXIMITY SENSOR

(71) Applicant: RESEARCH IN MOTION LIMITED, Waterloo (CA)

(72) Inventor: Thusenth Dhavaloganathan, Kitchener (CA)

(73) Assignee: BlackBerry Limited, Waterloo, Ontario (CA)

( * ) Notice: Subject to any disclaimer, the term of this patent is extended or adjusted under 35 U.S.C. 154(b) by 217 days.

(21) Appl. No.: 13/857,166

(22) Filed: Apr. 5, 2013

(65) Prior Publication Data

US 2014/0302893 A1 Oct. 9, 2014

(51) Int. Cl.
*H04B 1/38* (2015.01)
*H04M 1/725* (2006.01)

(52) U.S. Cl.
CPC ..... *H04M 1/72577* (2013.01); *H04M 1/72522* (2013.01); *H04M 2250/12* (2013.01)

(58) Field of Classification Search
CPC .............................. H04M 2250/12; G01J 5/02
USPC ............................... 455/460, 566, 556, 556.1
See application file for complete search history.

(56) References Cited

U.S. PATENT DOCUMENTS

| | | | |
|---|---|---|---|
| 7,057,591 B1* | 6/2006 | Hautanen | G06Q 30/02 345/211 |
| 8,170,621 B1 | 5/2012 | Lockwood | |
| 8,319,170 B2 | 11/2012 | Alameh et al. | |
| 8,319,742 B2* | 11/2012 | Doktorova | G06F 3/0233 345/169 |
| 8,340,696 B2 | 12/2012 | Endo et al. | |
| 2009/0305742 A1 | 12/2009 | Caballero et al. | |
| 2010/0159998 A1 | 6/2010 | Luke et al. | |
| 2010/0167783 A1 | 7/2010 | Alameh et al. | |
| 2010/0279602 A1* | 11/2010 | Larsson | H04B 7/15535 455/7 |
| 2010/0321321 A1 | 12/2010 | Shenfield et al. | |
| 2011/0136446 A1* | 6/2011 | Komninakis | H04B 7/0691 455/78 |
| 2011/0143769 A1* | 6/2011 | Jones | G06F 1/1624 455/456.1 |
| 2011/0286428 A1* | 11/2011 | Souissi | H04L 12/2812 370/331 |
| 2012/0147531 A1 | 6/2012 | Rabii | |
| 2012/0162866 A1* | 6/2012 | Bohn | G06F 1/1681 361/679.01 |

(Continued)

FOREIGN PATENT DOCUMENTS

WO WO2010/145031 12/2010

OTHER PUBLICATIONS

EPO, Extended European Search Report relating to EP application No. 13162481.9 dated Sep. 12, 2013.

(Continued)

*Primary Examiner* — Edward Urban
*Assistant Examiner* — Max Mathew
(74) *Attorney, Agent, or Firm* — Rowand LLP

(57) ABSTRACT

Methods and electronic devices for adjusting sensitivity of a proximity sensor are described. In an example aspect, the present application describes a method implemented by a processor of an electronic device for adjusting sensitivity of a proximity sensor associated with the electronic device. The proximity sensor is positioned biased towards a longitudinal side of the electronic device. The electronic device also includes an orientation sensor that generates orientation data based on an orientation of the electronic device. The method includes: obtaining orientation data from the orientation sensor; and increasing the sensitivity of the proximity sensor when the orientation of the electronic device is at a first tilted orientation based on the orientation data.

18 Claims, 4 Drawing Sheets

(56) References Cited

U.S. PATENT DOCUMENTS

| | | | |
|---|---|---|---|
| 2012/0189410 A1* | 7/2012 | Toebes | B65G 1/0492 414/273 |
| 2012/0257368 A1* | 10/2012 | Bohn | H04M 1/022 361/809 |
| 2013/0034234 A1* | 2/2013 | Chen | H04M 1/72591 381/58 |
| 2013/0077228 A1* | 3/2013 | Batio | G06F 1/1641 361/679.29 |
| 2014/0012528 A1* | 1/2014 | Carmel-Veilleux | G01S 17/08 702/88 |

OTHER PUBLICATIONS

Xdadevelopers, [Q] Change sensitivity of proximity sensor—xda-developers, Jul. 2, 2011.

Careers, How to change Android proximity sensor sensitivity?, Feb. 22, 2012.

Position Sensors, Android Developers, retrieved Feb. 25, 2013.

\* cited by examiner

METHODS AND DEVICES FOR ADJUSTING SENSITIVITY OF PROXIMITY SENSOR

TECHNICAL FIELD

The present disclosure relates to electronic device management, and more particularly, to methods and electronic devices for adjusting a sensitivity of a proximity sensor of an electronic device based on orientation of the electronic device.

BACKGROUND

Electronic devices, such as smartphones, are often equipped with a proximity sensor. A proximity sensor is a sensor capable of detecting the presence of nearby objects without requiring any physical contact with such objects. The proximity sensor allows such an electronic device to detect the presence of objects in proximity to the electronic device. The detection of objects by the electronic device may be used to perform various features and functions. For example, in one operating mode, the detection of an object in the vicinity of the electronic device, such as the presence of a hand of a user, may cause the electronic device to activate itself for usage and/or activate or de-activate a particular feature.

The proximity sensor may be associated with one or more operating characteristics, which control operating of the proximity sensor on the electronic device. The characteristics of the proximity sensor may, for example, define the range of detection of the proximity sensor, the power emitted by the proximity sensor, etc. These characteristics of the proximity sensor are often pre-set by the original equipment manufacturers (OEMs) of the electronic device.

BRIEF DESCRIPTION OF THE DRAWINGS

Reference will now be made, by way of example, to the accompanying drawings which show an embodiment of the present application, and in which.

Like reference numerals are used in the drawings to denote like elements and features.

DETAILED DESCRIPTION OF EXAMPLE EMBODIMENTS

In an example aspect, the present application describes a method implemented by a processor of an electronic device for adjusting sensitivity of a proximity sensor associated with the electronic device. The proximity sensor is positioned biased towards a longitudinal side of the electronic device. The electronic device also includes an orientation sensor that generates orientation data based on an orientation of the electronic device. The method includes: obtaining orientation data from the orientation sensor; and increasing the sensitivity of the proximity sensor when the orientation of the electronic device is at a first tilted orientation based on the orientation data.

In another example aspect, the present application describes an electronic device. The electronic device includes a proximity sensor, an orientation sensor, and a memory. The proximity sensor is positioned biased towards a longitudinal side of the electronic device. The orientation sensor generates orientation data based on an orientation of the electronic device. The electronic device also includes a processor coupled with the proximity sensor, the orientation sensor, and the memory. The processor is configured to: obtain orientation data from the orientation sensor; and increase the sensitivity of the proximity sensor when the orientation of the electronic device is at a first tilted orientation based on the orientation data.

In a further example aspect, the present application describes a computer readable storage medium. The computer readable storage medium includes computer executable instructions that are executable by a processor of an electronic device. The electronic device has a proximity sensor that is positioned biased towards a longitudinal side of the electronic device. The electronic device also includes an orientation sensor that generates orientation data based on an orientation of the electronic device. The computer executable instructions, when executed, configure the processor to: obtain orientation data from the orientation sensor; and increase the sensitivity of the proximity sensor when the orientation of the electronic device is at a first tilted orientation based on the orientation data.

Other example embodiments of the present disclosure will be apparent to those of ordinary skill in the art from a review of the following detailed description in conjunction with the drawings.

Example embodiments of the present disclosure are not limited to any particular operating system, electronic device architecture, server architecture or computer programming language.

Example Smartphone Electronic Device

Figure 1:
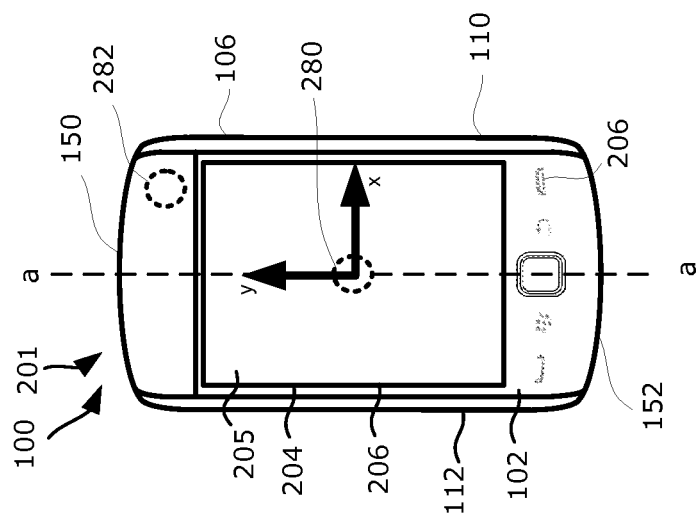
FIG. 1 is a front view of the example electronic device in accordance with example embodiments of the present disclosure.

Referring first to FIG. 1, an example embodiment of an electronic device 201 is provided. In FIG. 1, a front view of the example electronic device 201 is illustrated. The electronic device 201 may take a variety of forms. In the example shown, the electronic device 201 is a mobile communication device capable of at least voice communications. More specifically, in the example embodiment illustrated, the electronic device 201 is a smartphone 100.

The smartphone 100 is a mobile phone which offers more advanced computing capability than a basic non-smartphone cellular phone. For example, the smartphone 100 may have the ability to run third party applications which are stored on the smartphone 100. The smartphone 100 may also provide for data communication capabilities as well as voice communication capabilities. It will be appreciated that in at least some example embodiments, the electronic device 201 may be of other forms.

The smartphone 100 may include the components discussed below with reference to FIG. 4 or a subset of those components. The smartphone 100 includes a housing 106 which houses at least some of the components discussed above with reference to FIG. 1.

In the example embodiment illustrated, the smartphone 100 includes a touchscreen display 204 which acts as an input interface 206 and an output interface 205. The touchscreen display 204 is disposed within the smartphone 100 so that it is viewable at a front side 102 of the smartphone 100. That is, a viewable side of the touchscreen display 204 is disposed on the front side 102 of the smartphone. In the example embodiment illustrated, the touchscreen display 204 is framed by the housing 106.

The example smartphone 100 may include other input interfaces 206, such as one or more buttons, keys or navigational input mechanisms. In the example embodiment illustrated, some of these additional input interfaces 206 are disposed for actuation at the front side 102 of the smartphone 100.

The smartphone 100 additionally includes a proximity sensor 282. The proximity sensor 282 is capable of sensing the presence of objects in proximity to the electronic device 201. The proximity sensor 282 emits an electromagnetic field or a beam of electromagnetic radiation (such as, infrared light), and looks for changes in the electromagnetic field or reflected electromagnetic radiation. The presence of an object within the vicinity of the emitted electromagnetic field or electromagnetic radiation (i.e. within a sensing area of the proximity sensor 282) may cause a change in the electromagnetic field or reflection of the electromagnetic radiation that is detected by the proximity sensor 282. Accordingly, the proximity sensor 282 may detect the presence of the object near the electronic device 201.

The proximity sensor 282 is shown located underneath the housing 106 and above the touchscreen display 204, and oriented to detect objects on the front side 102 of the electronic device 201 (such as, the head 310 of a user). That is, the sensing area of the proximity sensor 282 is directed to the front side 102 of the electronic device 201. Accordingly, objects in proximity to the front side 102 may be detected while objects in proximity to the rear side 104 (FIG. 2) may not be detected. For example, the proximity sensor 282 may emit an electromagnetic field or electromagnetic radiation that is directed from the front side 102, and a change in the electromagnetic field or reflection in electromagnetic radiation caused by the presence of an object in proximity to the front side 102 may be detected by the proximity sensor 282, and the electronic device 201 may then determine that an object is present.

The electronic device 201 is of a rectangular shape with four sides forming a rectangular front face of the electronic device 201, including two parallel longitudinal sides 110, 112 (including a left longitudinal side 112 and a right longitudinal side 110) connected together by two connecting sides 150, 152 (a top connecting side 150 and a bottom connecting side 152). The connecting sides 150, 152 are shorter than the longitudinal sides 110, 112. The longitudinal sides 110, 112 are the left and right sides of the electronic device 201 when the electronic device 201 is held in a portrait orientation. The "left" and "right" notations that are used in association with these sides 110, 112, refer to directions that exist when a front face of the electronic device 201 is viewed. The front side of the electronic device 201 is typically the side on which a main display is mounted. These "left" and "right" notations will be used throughout this document to refer to sides of the electronic device 201 when viewed from the front of the electronic device. Since some of the figures in this document illustrate rear views of the electronic device 201 (e.g. FIGS. 2 and 3), the "left" and "right" longitudinal sides may appear reversed.

The proximity sensor 282 is biased towards one of the longitudinal sides 110, 112. In the example illustrated, the proximity sensor 282 is located biased towards the right longitudinal side 110 of the front side 102 of the smartphone 100. Accordingly, the proximity sensor 282 is positioned closer to the right longitudinal side 110 than the left longitudinal side 112. For further illustrative purposes, an axis a-a is shown which is a vertical axis along the center of the electronic device 201. The axis a-a is parallel to the two longitudinal sides 110, 112 and is equidistant from both of these sides, thereby splitting the electronic device 201 to form two symmetrical sides, i.e. a left side and a right side. The proximity sensor 282 is off-centre; it is offset from the center axis a-a. In the example shown, the proximity sensor 282 is located on the right side of axis a-a, which is closer to the right longitudinal side 110.

It will be appreciated that, in other embodiments, the proximity sensor 282 may instead be located biased towards the left longitudinal side 112 of the front side 102 of the smartphone 100. That is, the proximity sensor 282 may be positioned closer to the left longitudinal side 112 than the right longitudinal side 110. More particularly, the proximity sensor 282 is located on the left side of axis a-a which is closer to the left longitudinal side 112.

The electronic device includes one or more orientation sensors 280. The orientation sensor 280 is configured to detect the orientation of the electronic device 201 relative to a default orientation, such as the portrait orientation illustrated in FIG. 1. The orientation sensor 280 may be associated with a plurality of sensing axes, which may be used to sense the orientation of the electronic device 201 in a plurality of dimensions. In some embodiments, the orientation sensor 280 may be associated with three sensing axes, which may be used to sense x, y and z components of a current orientation. Each of these sensing axes may be aligned with certain features of the electronic device 201. In the example, two of these sensing axes are illustrated. A first axis y is aligned with the center axis a-a of the electronic device 201 and is generally parallel to the longitudinal sides 110, 112. In the example, the first axis y is directed upward towards the top connecting side 150. The second axis x is perpendicular to the first axis and is generally parallel to the top and bottom connecting sides 150, 152. The second axis is directed towards the right longitudinal side 110 of the electronic device 201. A third sensing axis z may be perpendicular to both the first and second sensing axes.

It will be appreciated that the sensing axes may be aligned with other features and the electronic device 201 may include a plurality of components which may be used for determining the orientation of the electronic device 201. For example, a gyroscope, accelerometer and/or magnetometer may be used.

The orientation sensor 280 may, for example, detect the orientation of the orientation sensor relative to gravity, g. That is, the gravitational field may provide a reference point for determining the orientation of the electronic device 201.

The orientation sensor is typically disposed within the housing 106 and is not viewable from the exterior of the electronic device. However the orientation sensor has been shown as a circle in order to illustrate the sensing axes. The orientation sensor 280 would, however, typically not be shaped this way; it may be packaged in a standard integrated circuit (IC).

Example Operating Environment

Figure 2:
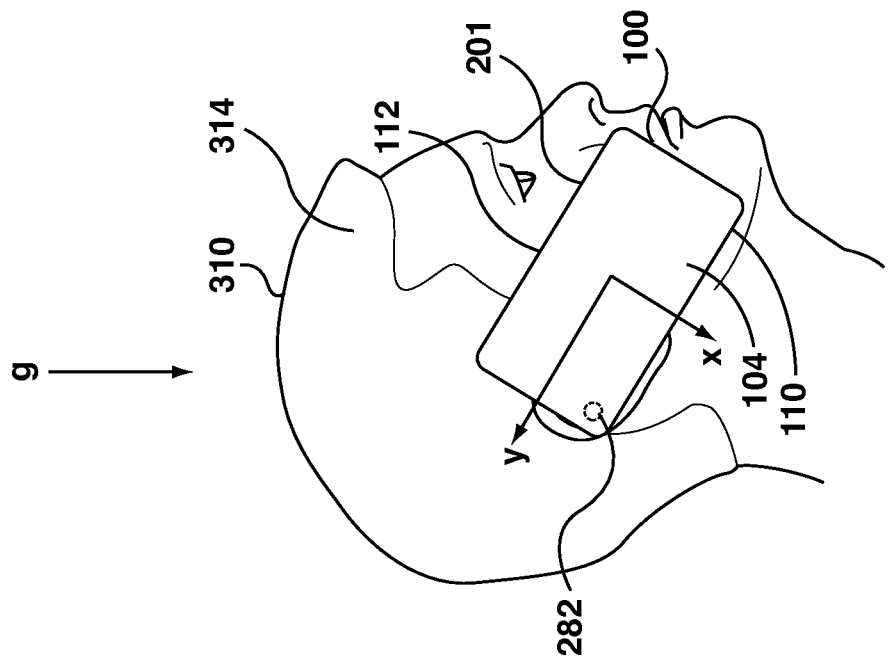
FIG. 2 is an example electronic device held on a first side of a head in accordance with example embodiments of the present disclosure.
Figure 3:
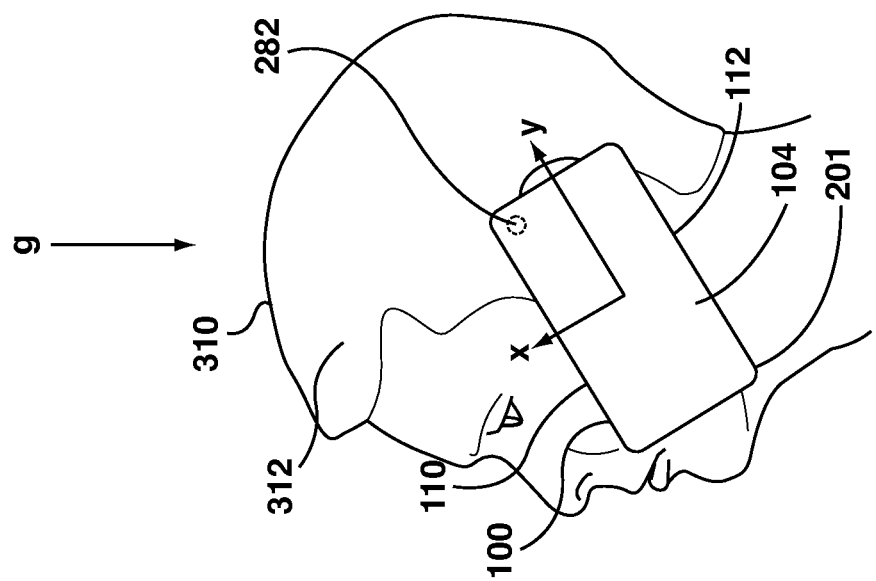
FIG. 3 is the example electronic device held on a second side of a head in accordance with example embodiments of the present disclosure.

Reference is now made to FIGS. 2 and 3 which illustrate example operating environments of the example electronic device 201. As will be described in greater detail below, the operating conditions for the proximity sensor 282 that is biased towards one of the longitudinal sides 110, 112 of the electronic device 201 may change depending on whether the electronic device 201 is held at a right side 314 of the head 310 or a left side 312 of the head 310.

More particularly, FIGS. 2 and 3 show a user conventionally operating the electronic device 201 during a phone call by holding the electronic device 201 tilted against a left side 312 of a head 310 (FIG. 2) or a right side 314 (FIG. 3) of the head 310 of the user. As noted above, the electronic device 201 includes a proximity sensor 282 which allows the electronic device 201 to detect the presence of a nearby object, such as a head 310. In at least some embodiments, when the presence of a head 310 is detected, the electronic device 201 may turn off a touchscreen display associated with the electronic device 201 to avoid having the touchscreen display activated inadvertently by a face of the user.

In the embodiment illustrated, the proximity sensor 282 is not centered on the electronic device 201. That is, the proximity sensor 282 is biased towards one of the longitudinal sides 110, 112 of the electronic device 201. Due to this orientation, the proximity sensor 282 is aligned with different features of the head 310 depending on whether it is held on the left side 312 or the right side 314 of the head 310. For example, the proximity sensor 282 may be further from the head 310 in one of these positions than in the other of these positions. As a result, the output of the proximity sensor 282 may be different when it the electronic device 201 is held on the left side 312 of a head 310 than when the electronic device is held on the right side 314 of the head 310.

As will be described in greater detail below, an orientation sensor may be used to determine which side of the head 310 the electronic device 201 is being held on. Based on this determination, the proximity sensor 282 may be adjusted. More particularly, a sensitivity associated with the proximity sensor 282 may be adjusted depending on whether the electronic device 201 is determined to be held on the left side 312 of the head or the right side 314 of the head 310.

Accordingly, as will be described in greater detail below, the electronic device 201 may be configured to adjust sensitivity of an associated proximity sensor 282 based on the orientation of the electronic device 201 when being held by the user for the phone call (i.e. whether it is an orientation associated with a left side 312 of the head 310 or an orientation associated with a right side 314 of the head 310)

Referring now to FIG. 2, the electronic device 201 is shown at a left side 312 of a human head 310. The electronic device 201, being a smartphone 100, is illustrated as being held to allow a speaker (not shown) to be aligned with an ear of the head 310 and a microphone (not shown) to be aligned in close proximity to a mouth of the head 310.

In the example, a rear side 104 of the electronic device 201 is illustrated. The rear side 104 is typically a side which does not include the main display of the electronic device 201. The rear side 104, in at least some embodiments, is the side of the electronic device 201 which is opposite to the side which includes the main display (i.e. it is opposite the front side). As illustrated, the front side is the side facing a side of the head 310 of the user when the electronic device 201 is held during a phone call. The rear side 104 serves as the portion a user may hold by a hand (not shown) when operating the electronic device 201 for the phone call.

As noted above, the electronic device 201 includes a proximity sensor 282. The proximity sensor 282 may, for example, be used to detect the presence of a human head 310 in vicinity of the electronic device. More particularly, when the electronic device 201 operates in a voice communication operating mode, the proximity sensor 282 may attempt to detect the presence of a head 310 of the user. An initiation of a phone call on the electronic device 201 may enable the voice communication operating mode on the electronic device 201. The presence of the side of the head 310 in proximity to the electronic device 201 may be detected by the electronic device using the proximity sensor when the device is conventionally held by the user for the phone call. When operating in the voice communication mode, the detection of an object by the proximity sensor 282 may be interpreted as a detection of the head 310 of the user. That is, if the electronic device 201 is operating in a voice communication mode (and the voice communication mode is a handset mode as contrasted with a speakerphone mode), when an object is detected by the electronic device 201 using the proximity sensor 282, the electronic device 201 may conclude that a head 310 is in proximity to the electronic device 201 and may, for example, turn off a touch-sensitive input interface associated with a front face of the electronic device to avoid having the touch-sensitive input interface being inadvertently activated by the head 310.

Referring to FIG. 3, the electronic device 201 is illustrated being held instead against the right side 314 of the head 310 by the user in a position suitable for engaging in a telephone call. The electronic device 201 is now in a tilted orientation that is in a different direction than the tilted orientation shown in FIG. 2. The tilted orientation of FIG. 3 may be defined as a second tilted orientation of the electronic device 201.

As noted above, since the proximity sensor 282 is biased towards one of the longitudinal sides 110, 112 (i.e. since it is off-centre), it will be aligned with different facial features depending on whether it is held on the left side 312 or right side 314 of the head 310. As illustrated in FIG. 2, where an electronic device 201 having a proximity sensor 282 that is biased towards a right longitudinal side 110 is held at a left side 312 of a head 310, the proximity sensor 282 may align with a region of the head 310 other than the ear. That is, the proximity sensor 282 may align with a region of the head 310 that is adjacent to the ear. In this position, the gap between the proximity sensor 282 and the object that it is trying to detect (i.e. the head 310) is quite large in comparison to the gap that exists when the electronic device 201 is held at the right side 314 of the head 310 (a scenario is illustrated in FIG. 3) and the proximity sensor 282 aligns with the ear. More particularly, as illustrated in FIG. 3, when the electronic device 201 having the proximity sensor 282 that is biased towards the right longitudinal side is held at the right side 314 of the head 310, the proximity sensor 282 is largely aligned with an ear and the gap between the proximity sensor 282 and the head 310 is lessened.

Due to the differing features that may be aligned with the proximity sensor 282 (i.e. depending on whether the electronic device 201 is held on the first side of the head 310 or the second side of the head 310), the electronic device 201 may be configured to operate differently depending on whether the electronic device 201 is situated on the left side 312 of the head 310 or on the right side 314 of the head 310.

As can be seen by comparing the operating environment in FIG. 2 with that in FIG. 3, the sensing axes of the orientation sensor 280 have a different orientation depending on the side of the head 310 where the device is held. As illustrated in FIG. 2, when the electronic device 201 is held at the left side 312 of the head 310, the second axis x is directed upwardly, in part. In contrast, when held at the right side 314 of the head 310 (as illustrated in FIG. 3), the second axis x is directed downwardly, in part. Thus, the orientation sensor 280 may be used to determine whether the electronic device 201 is held on a left side of the head 310 or whether it is held on a right side 314 of the head 310.

Accordingly, the orientation sensor may generate orientation data which specifies an orientation of the electronic device 201. Such orientations may be used by the electronic device, for example, to determine whether the electronic device 201 is held at a left side 312 of a head 310 or at a right side 314 of the head 310. That is, the electronic device 201 is tilted differently depending on whether it is held on a left side 312 of the head 310 or on a right side 314 of the head 310. It is tilted in one direction when held on the left side 312 of the head 310 (as illustrated in FIG. 2) and is tilted in a second, opposite, direction when held on the right side 314 of the head 310 (as illustrated in FIG. 3). When a user is holding the electronic device 201 on one side of their head 310 (e.g. the left side 312) to engage in a telephone call, the electronic device 201 may be said to be held in a first tilted orientation and when the device is held at the other side of their head 310 (e.g. the right side 314) to allow the user to engage in a telephone call, the electronic device may be said to be held in a second tilted orientation. As will be discussed below, proximity sensor 282 adjustments may be made based on determined tilt orientations of the electronic device 201. That is, the orientation sensor is effectively used to determine whether the electronic device 201 is held on a left side 312 of the head 310 or on a right side 314 of the head 310 and the adjustment of the proximity sensor may account for the specific side of the head 310 where the electronic device 201 is being used.

More particularly, the orientation sensor 280 may generate orientation data which is obtained by the electronic device 201. The electronic device 201 may then determine whether the orientation of the electronic device 201 is at a first tilted orientation (which may be associated with one side of the head 310 e.g. the left side 312) or a second tilted orientation (which may be associated with another side of the head 310 e.g. the right side 314) based on the orientation data. Upon determining that the electronic device 201 is at the first tilted orientation (i.e. upon determining that the electronic device having a proximity sensor that is biased towards the right longitudinal side is being held on the left side of the head 310), the electronic device 201 may increase a sensitivity associated with the proximity sensor 282. More particularly, where the electronic device 201 is held at a side of the head 310 where a relatively large gap exists between the proximity sensor 282 and the head 310 (which, in the example described above is the left side 312 of the head 310 due to the location of the proximity sensor 282), then the proximity sensor 282 may be made more sensitive to account for this gap. In contrast, where the electronic device 201 is held at a side of the head 310 where a relatively small gap exists between the proximity sensor 282 and the head 310 (which, in the example described above is the right side 314 of the head 310), then the proximity sensor 282 may be made less sensitive to account for the smaller gap.

It will be appreciated that, if the proximity sensor 282 were biased towards the left longitudinal side rather than the right longitudinal side, then the sensitivity of the proximity sensor 282 might be decreased in response to detecting that the electronic device 201 is held in the first tilted orientation (i.e. the orientation associated with the left side 312). That is, in such example embodiments, the adjustment of the sensitivity of the proximity sensor 282 is correspondingly flipped, as now the proximity sensor 282 is positioned closer to the head 310 of the user when held against the left side 312 of the head 310 during a phone call, and the proximity sensor 282 is positioned further away from the head 310 of the user when held against the right side 314 of the head during the phone call. Accordingly, the sensitivity of the proximity sensor 282 is decreased when the electronic device 201 is held against the left side 312 of the head 310, while the sensitivity of the proximity sensor 282 is increased when the electronic device 201 is held against the right side 314 of the head 310.

As will be described in greater detail below, the proximity sensor 282 may, in some embodiments, be used by the electronic device 201 to avoid inadvertent input due to contact with the touchscreen during a voice communication. For example, if the voice communication operating mode is enabled on the electronic device 201 and a handset mode is being used (as opposed to a speakerphone mode), the presence of an object in proximity to the electronic device 201 may be detected based on the proximity sensor 282 data. After such an object is detected, in some embodiments, to avoid inadvertent input caused by contact between the head 310 and the electronic device, the electronic device 201 may disable processing of instructions input via an associated touchscreen display of the electronic device 201. For example, interface elements displayed on the touchscreen display which may correspond to associated telephony functions may be prevented from being selected via the touchscreen display. Accordingly, accidental contact by a user against the touchscreen display (for example, by a cheek, ear, etc.) will not inadvertently cause operations to be performed by the electronic device 201 during the phone call.

Example Electronic Device

Figure 4:
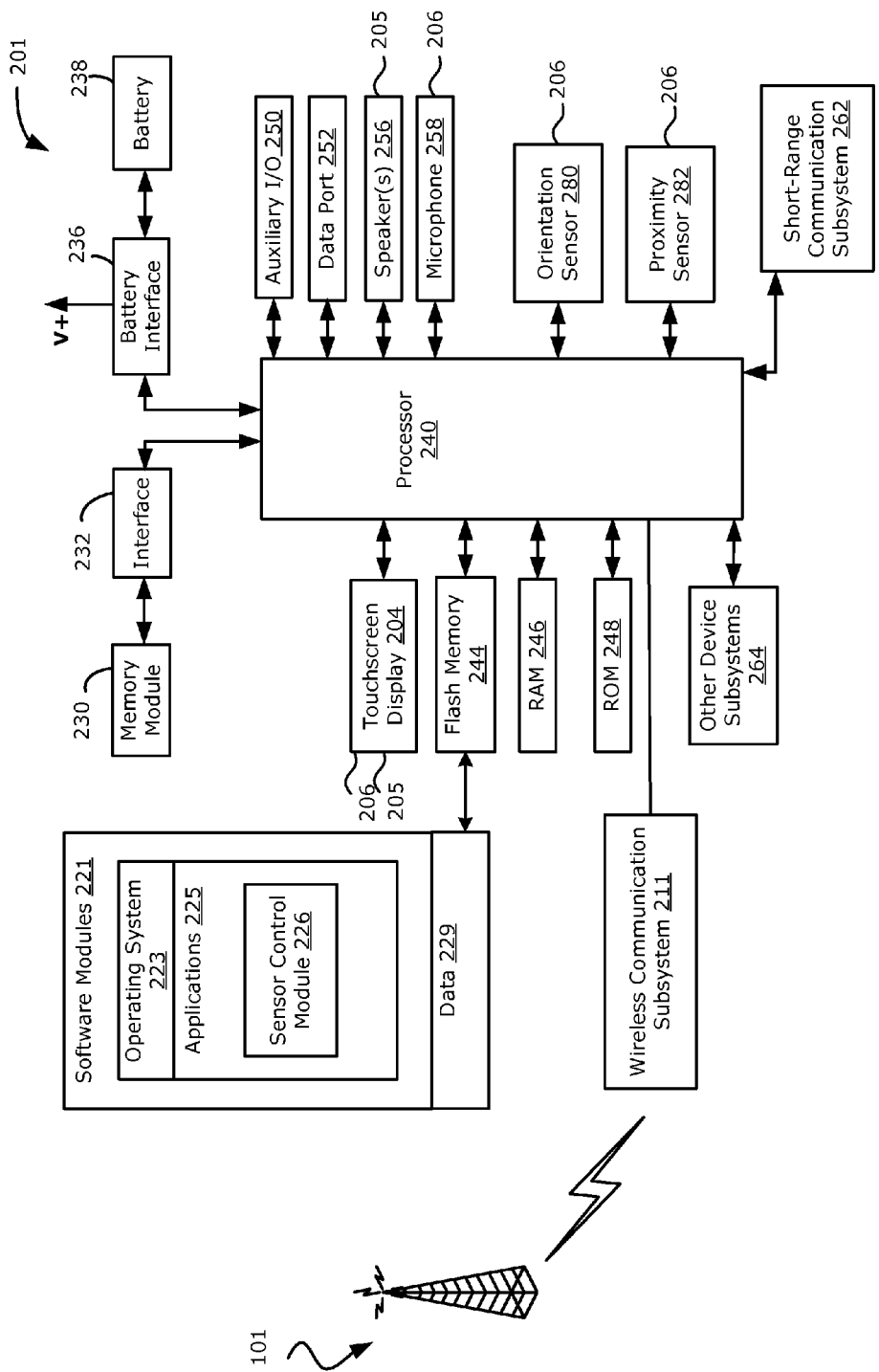
FIG. 4 is a block diagram illustrating the example electronic device in accordance with example embodiments of the present disclosure.

Reference is next made to FIG. 4 which illustrates a block diagram of the example electronic device 201. In the example embodiment illustrated, the electronic device 201 is a mobile communication device. That is, the electronic device 201 is configured to communicate with other electronic devices, servers and/or systems (i.e. it is a "communication" device) and the electronic device 201 is portable and may be easily moved between different physical locations (i.e. it is a "mobile" device).

Depending on the functionality provided by the electronic device 201, in various example embodiments the electronic device 201 may be a multiple-mode communication device configured for both data and voice communication, a mobile telephone such as a smartphone 100, a wearable computer such as a watch, a tablet computer such as a slate computer, a personal digital assistant (PDA), or a computer system. The electronic device 201 may take other forms apart from those specifically listed above. The electronic device 201 may also, in various example embodiments, be referred to as a mobile communications device, a communication device, a mobile device, an electronic device and, in some cases, as a device.

The electronic device 201 includes a housing 106 (FIG. 1), housing the components of the electronic device 201. The internal components of the electronic device 201 are constructed on a printed circuit board (PCB). The electronic device 201 includes a controller including at least one processor 240 (such as a microprocessor) which controls the overall operation of the electronic device 201. It will be appreciated that, in at least some example embodiments, the controller may, instead of or in addition to the processor 240, include an analog circuit or other types of circuits capable of performing a part or all of the functions of the processor 240 that are described herein. The processor 240 interacts with device subsystems such as a wireless communication subsystem 211 for exchanging radio frequency signals with a wireless network 101 to perform communication functions. The processor 240 may be communicably coupled with additional device subsystems including one or more output interfaces 205 (such as a touchscreen display 204, one or more speakers 256, and/or other output interfaces 205), one or more input interfaces 206 (such as a microphone 258, an orientation sensor 280, a proximity sensor 282, a keyboard (not shown), control buttons (not shown), a touch-sensitive overlay associated with the touchscreen display 204, a camera (not shown) and/or other input interfaces 206), memory (such as flash memory 244, random access memory (RAM) 246, read only memory (ROM) 248, etc.), auxiliary input/output (I/O) subsystems 250, a data port 252 (which may be a serial data port, such as a Universal Serial Bus (USB) data port), a short-range communication subsystem 262 and other device subsystems generally designated as 264. Some of the subsystems shown in FIG. 4 perform communication-related functions, whereas other subsystems may provide "resident" or on-device functions.

The electronic device 201 may include a touchscreen display 204 which acts as both an input interface 206 (i.e. touch-sensitive overlay) and an output interface 205 (i.e. display). The touchscreen display 204 may be constructed using a touch-sensitive input surface connected to an electronic controller. The touch-sensitive input surface overlays the touchscreen display 204 and may be referred to as a touch-sensitive overlay. The touch-sensitive overlay and the electronic controller provide a touch-sensitive input interface 206 and the processor 240 interacts with the touch-sensitive overlay via the electronic controller.

The particular design of the wireless communication subsystem 211 depends on the wireless network 101 in which the electronic device 201 is intended to operate. The wireless network 101 may include one or more of a Wireless Wide Area Network (WWAN) and/or a Wireless Local Area Network (WLAN) and/or other suitable network arrangements. In some example embodiments, the electronic device 201 is configured to communicate over both the WWAN and WLAN, and to roam between these networks. The electronic device 201 may send and receive communication signals over the wireless network 101 via the wireless communication subsystem 211 after the required network registration or activation procedures have been completed.

In at least some example embodiments, the auxiliary input/output (I/O) subsystems 250 may include an external communication link or interface; for example, an Ethernet connection. The electronic device 201 may include other wireless communication interfaces for communicating with other types of wireless networks 101; for example, a wireless network 101 such as an orthogonal frequency division multiplexed (OFDM) network. The auxiliary I/O subsystems 250 may include a vibrator for providing vibratory notifications in response to various events on the electronic device 201 such as receipt of an electronic communication or incoming phone call, or for other purposes such as haptic feedback (i.e. touch feedback).

In at least some example embodiments, the electronic device 201 also includes a removable memory module 230 (which may be flash memory, such as a removable memory card) and a memory interface 232. Network access may be associated with a subscriber or user of the electronic device 201 via the memory module 230, which may be a Subscriber Identity Module (SIM) card for use in a GSM network or other type of memory card for use in the relevant wireless network type. The memory module 230 is inserted in or connected to the memory interface 232 of the electronic device 201 in order to operate in conjunction with the wireless network 101.

The data port 252 may be used for synchronization with a user's host computer system (not shown). The data port 252 enables a user to set preferences through an external device or software application and extends the capabilities of the electronic device 201 by providing for information or software downloads to the electronic device 201 other than through the wireless network 101. The alternate download path may for example, be used to load an encryption key onto the electronic device 201 through a direct, reliable and trusted connection to thereby provide secure device communication.

In at least some example embodiments, the electronic device 201 is provided with a service routing application programming interface (API) which provides an application with the ability to route traffic through a serial data (i.e., USB) or Bluetooth® (Bluetooth® is a registered trademark of Bluetooth SIG, Inc.) connection to a host computer system using standard connectivity protocols. When a user connects their electronic device 201 to the host computer system via a USB cable or Bluetooth® connection, traffic that was destined for the wireless network 101 is automatically routed to the electronic device 201 using the USB cable or Bluetooth® connection. Similarly, any traffic destined for the wireless network 101 is automatically sent over the USB cable or Bluetooth® connection to the host computer system for processing.

In at least some example embodiments, the electronic device 201 may include one or more sensors. For example, the electronic device 201 may include an orientation sensor 280 that detects the orientation of the electronic device 201 or that generates information from which the orientation of the electronic device 201 can be determined, such as acceleration or motion information. In at least some example embodiments, the orientation sensor 280 is an accelerometer, such as a three-axis accelerometer. An accelerometer is a sensor which converts acceleration from motion (e.g. movement of the electronic device 201 or a portion thereof due to the strike force) and gravity, which are detected by a sensing element, into an electrical signal (producing a corresponding change in output). Accelerometers may be available in one, two or three axis configurations. Higher order axis configurations are also possible. Accelerometers may produce digital or analog output signals depending on the type of accelerometer. Accordingly, the acceleration data generated by the accelerometer may be used to determine the orientation of the electronic device 201.

In at least some example embodiments, the orientation sensor 280 may be a gyroscope (such as, a three-axis gyroscope). A gyroscope is a sensor that measures the rotational velocity of the electronic device 201. That is, the gyroscope may generate an output which specifies the rotational rate of the electronic device 201. For example, the gyroscope may define one or more sensing axis, and motion at each of the one or more sensing axis may be measured as a rotation per unit of time, irrespective of the other sensing axis. Accordingly, the gyroscope may generate motion data associated with movements of the electronic device 201. This motion data generated by the gyroscope may be used to determine the orientation of the electronic device 201.

In other example embodiments, the orientation sensor 280 may be of other forms instead of or in addition to an accelerometer and/or a gyroscope. For example, the orientation sensor 280 may be a gravity sensor, a tilt sensor, an electronic compass or other suitable sensors, or combinations thereof.

The orientation sensor 280 (such as, the accelerometer and/or gyroscope) may generate orientation data which specifies the orientation of the electronic device 201. The orientation data, in at least some example embodiments, specifies the orientation of the electronic device 201 relative to gravity, g (i.e. the gravitational field of the earth). In at least some example embodiments, the orientation data may be used to influence various functions on the electronic device 201. For example, the electronic device 201 may switch between a portrait operating mode and a landscape operating mode based on the orientation data, allow for user interface control to manipulate operations within a game application based on the orientation data, allow for image stabilization when capturing an image from an associated camera based on the orientation data, etc. Similarly, in at least some example embodiments, the orientation data may be used to manipulate the settings of the components of the electronic device, such as the proximity sensor 282. More particularly, the sensitivity of the proximity sensor 282 may be changed (i.e. increased or decreased) based on the orientation data (for example, if the orientation data defines tilted orientations of the electronic device 201). Greater details of such adjustments of the proximity sensor 282 are described below.

It will also be appreciated that the orientation data may be used to manipulate other functions and features of the electronic device 201 not specifically described herein.

As mentioned above, the electronic device 201 may also include a proximity sensor 282. The proximity sensor 282 is capable of sensing the presence of objects in proximity to the electronic device 201. The proximity sensor 282 emits an electromagnetic field or a beam of electromagnetic radiation (such as, infrared light), and looks for changes in the electromagnetic field or reflected electromagnetic radiation. The presence of an object within the vicinity of the emitted electromagnetic field or electromagnetic radiation (i.e. within a sensing area of the proximity sensor 282) may cause a change in the electromagnetic field or reflection of the electromagnetic radiation that is detected by the proximity sensor 282. Accordingly, the proximity sensor 282 may detect the presence of the object near the electronic device 201. In such a manner, a user's head 310, hand and/or other body part may be detected by the proximity sensor 282 when near the electronic device 201.

As noted above in the discussion of FIGS. 1 to 3, the proximity sensor 282 may be located biased towards a longitudinal side 110, 112 (FIG. 1) of the electronic device 201. As also noted above, the proximity sensor 282 is orientated to detect objects on the front side of the electronic device 201.

The proximity sensor 282 may be associated with one or more characteristics which affect the operation of the proximity sensor 282 and/or which affect the conclusions that are made based on data obtained at the proximity sensor 282. For example, one characteristic is a sensitivity of the proximity sensor 282. The sensitivity of the proximity sensor 282 affects how sensitive the electronic device 201 is to nearby objects. For example, the sensitivity may define the range of the proximity sensor 282. The range of the proximity sensor 282 may be defined as a distance at which an object may be detected by the proximity sensor 282. For example, the size of a sensing area (i.e. the coverage area) of the proximity sensor 282 may define the range of the proximity sensor 282. Objects within the sensing area will be detected by the proximity sensor 282, while objects outside of the sensing area will not be detected by the proximity sensor 282. The sensitivity may define the distance at which an object must be from the proximity sensor 282 for the sensor to recognize the presence of that object.

The range may be adjusted, for example, by adjusting the power level associated with the proximity sensor 282. The level of power emitted by the proximity sensor 282 may be defined as the strength of the electromagnetic field or electromagnetic radiation emitted by the proximity sensor 282. The stronger the electromagnetic field or electromagnetic radiation emitted, the further away an object can be detected by the electronic device 201, as the electromagnetic field or electromagnetic radiation may reach these objects. Additionally, objects closer to the electronic device 201 may be more precisely detected. Thus, in at least some embodiments, the sensitivity of the proximity sensor 282 is a setting that controls the power level of the proximity sensor and thus the range of the proximity sensor. Increasing the sensitivity is performed by increasing the power level and decreasing the sensitivity is performed by decreasing the power level.

The sensitivity of the proximity sensor 282 may, in some embodiments, be a threshold associated with the proximity sensor. More particularly, the proximity sensor 282 may have one or more thresholds associated therewith which are used when determining whether an object is within the vicinity of the electronic device. For example, in some embodiments, a first threshold may represent a minimum level of change of the electromagnetic field or reflected electromagnetic radiation which must exist before it will be determined that an object is present. That is, it represents a minimum proximity sensor reading that is used to determine that an object is present. For example, where the proximity sensor 282 detects proximity based on electromagnetic radiation that is reflected off an object in proximity to the electronic device and received at the proximity sensor 282, then a threshold may control how much electromagnetic radiation must be detected before the electronic device 201 will determine that an object is present. This threshold may, in some embodiments, be referred to as the sensitivity of the proximity sensor. The electronic device 201 may use this threshold to determine whether the level of change of the electromagnetic field or reflected electromagnetic radiation is at least above a certain threshold amount (i.e. whether an object in proximity to the electronic device 201 changes the electromagnetic field or reflects electromagnetic radiation to a level that meets a certain threshold so that the object can be determined to be present).

Similarly, in some embodiments, a time threshold may be associated with the proximity sensor 282 and may act as a sensitivity setting for the proximity sensor 282. The time threshold may represent a minimum amount of time that the proximity sensor readings must stay above the first threshold before the electronic device 201 will determine that an object is nearby. This time threshold is used so that transient proximity sensor readings that are briefly above the first threshold (e.g. due to movement of the electronic device briefly by an object that is not a head 310) are ignored in some operating modes.

In at least some example embodiments, the sensitivity of the proximity sensor 282 may be adjusted. In such example embodiments, the sensitivity of the proximity sensor 282 may be adjusted based on the orientation data. The electronic device 201 may obtain orientation data from the orientation sensor 280, and determine whether the orientation of the electronic device 201 is at a first tilted orientation (i.e. associated with the left side 312 of the head 310) or a second tilted orientation (i.e. associated with a right side 314 of the head 310). The sensitivity of the proximity sensor 282 is, in some embodiments, increased when the orientation of the electronic device 201 is at the first tilted orientation and decreased when the orientation of the electronic device 201 is at the second tilted orientation. Accordingly, the sensitivity of the proximity sensor 282 is manipulated based on the orientation of the electronic device 201.

In at least some example embodiments, after detecting the presence of an object (such as, the head 310 of the user) in proximity to the electronic device 201, the electronic device 201 may use the information to perform various functions. For example, in at least some example embodiments, the information may be used to enable or disable processing of instructions input via the touchscreen display 204 (for example, by activating or de-activating the touchscreen display 204), increase or decrease power emitted from the wireless communication subsystem 211, and/or other operations.

It will be appreciated that the electronic device 201 may include other sensors not specifically described herein.

The electronic device 201 also includes or is connectable to a power source such as a battery 238. The battery may be one or more rechargeable batteries that may be charged for example, through charging circuitry coupled to a battery interface 236 such as the data port 252. The battery 238 provides electrical power to at least some of the electrical circuitry in the electronic device 201, and the battery interface 236 provides a mechanical and electrical connection for the battery 238. The battery interface 236 is coupled to a regulator (not shown) which provides power V+ to the circuitry of the electronic device 201.

The electronic device 201 stores data 229 in an erasable persistent memory, which in one example embodiment is the flash memory 244. In various example embodiments, the data 229 includes service data including information used by the electronic device 201 to establish and maintain communication with the wireless network 101. The data 229 may also include user application data such as email messages, address book and contact information, image data, calendar and schedule information, notepad documents, image files, and other commonly stored user information stored on the electronic device 201 by its user, and other data. The data 229 stored in the persistent memory (e.g. flash memory 244) of the electronic device 201 may be organized, at least partially, into one or more databases or data stores. The databases or data stores may contain data items of the same data type or associated with the same application. For example, email messages, contact records, and task items may be stored in individual databases within the memory. The data 229 may further include sensor related data. For example, the sensor related data may include orientation sensor related data that defines a range of orientations that are associated with a left side 312 of a head 310 and a range of orientations that are associated with a right side 314 of the head 310.

A predetermined set of applications that control basic device operations, including data and possibly voice communication applications may be installed on the electronic device 201 during or after manufacture. Additional applications and/or upgrades to the operating system 223 or software applications 225 may also be loaded onto the electronic device 201 through the wireless network 101, the auxiliary I/O subsystem 250, the data port 252, the short-range communication subsystem 262, or other suitable device subsystem 264. The downloaded programs or code modules may be permanently installed, for example, written into the program memory (i.e. the flash memory 244), or written into and executed from the RAM 246 for execution by the processor 240 at runtime.

The electronic device 201 may, in at least some example embodiments, be a mobile communication device which may provide two principal modes of communication: a data communication mode and a voice communication mode. In the data communication mode, a received data signal such as a text message, an email message, or a web page download will be processed by the wireless communication subsystem 211 and input to the processor 240 for further processing. For example, a downloaded web page may be further processed by a browser application or an email message may be processed by an email messaging application and output to the touchscreen display 204. A user of the electronic device 201 may also compose data items, such as email messages, for example, using the input devices in conjunction with the touchscreen display 204. These composed items may be transmitted through the wireless communication subsystem 211 over the wireless network 101.

In the voice communication mode, the electronic device 201 provides telephony functions and operates as a typical cellular phone (such as, allowing for phone calls). The overall operation is similar to the data communication mode, except that the received signals would be output to the speaker 256 and signals for transmission would be generated by a transducer such as the microphone 258. The telephony functions are provided by a combination of software/firmware (e.g., a voice communication module) and hardware (e.g., the microphone 258, the speaker 256 and input interfaces 206). Alternative voice or audio I/O subsystems, such as a voice message recording subsystem, may also be implemented on the electronic device 201. Although voice or audio signal output is typically accomplished primarily through the speaker 256, the touchscreen display 204 may also be used to provide an indication of the identity of a calling party, duration of a voice call, or other voice call related information.

The processor 240 operates under stored program control and executes software modules 221 stored in memory such as persistent memory; for example, in the flash memory 244. As illustrated in FIG. 4, the software modules 221 include operating system software 223 and other software applications 225 including a sensor control module 226.

The software applications 225 on the electronic device 201 may also include a range of additional applications including, for example, a notepad application, Internet browser application, voice communication (e.g. telephony) application, mapping application, media player application, or any combination thereof. Each of the software applications 225 may include layout information defining the placement of particular fields and graphic elements (e.g. text fields, input fields, icons, etc.) in the user interface (e.g. the touchscreen display 204) according to the application.

The software modules 221 or parts thereof may be temporarily loaded into volatile memory such as the RAM 246. The RAM 246 is used for storing runtime data variables and other types of data or information, as will be apparent. Although specific functions are described for various types of memory, this is merely one example, and it will be appreciated that a different assignment of functions to types of memory could also be used.

As noted above, the electronic device 201 includes various detection and adjustment capabilities. In one such example embodiment, the sensor control module 226 may be configured to perform some these detection and adjustment functionalities by interfacing with various components such as the orientation sensor 280 and the proximity sensor 282. For example, in at least some example embodiments, the electronic device 201 may obtain orientation data from the orientation sensor 280, and determine whether the orientation of the electronic device 201 is at a first tilted orientation or a second tilted orientation based on the obtained orientation data.

More particularly, the electronic device 201 may determine whether the orientation is one associated with a left side 312 of the head 310 or the right side 314 of the head 310. This determination may be made by comparing the orientation of the electronic device to predetermined ranges of orientations. For example, a first range of orientations may be associated with a first side of the head 310 and a second range of orientations may be associated with a second side of the head 310. The first range includes the first tilted orientation and the second range includes the second tilted orientation.

The sensor control module 226 may then adjust the sensitivity of the proximity sensor 282 based on the determined orientation of the electronic device 201. More particularly, the sensor control module 226 may increase the sensitivity of the proximity sensor 282 when the orientation of the electronic device 201 is in the first tilted orientation, and decrease the sensitivity of the proximity sensor 282 when the orientation of the electronic device 201 is in the second tilted orientation. As mentioned above, in at least some example embodiments, by varying the sensitivity of the proximity sensor 282, the range of the proximity sensor 282 may be correspondingly varied. That is, increasing the sensitivity of the proximity sensor 282 may include increasing the range of the proximity sensor 282, and decreasing the sensitivity of the proximity sensor 282 may include decreasing the range of the proximity sensor 282.

Additionally, in at least some example embodiments, by varying the sensitivity of the proximity sensor 282, the level of power emitted by the proximity sensor 282 may be correspondingly varied (i.e. varying the strength of the electromagnetic field or radiation emitted). That is, increasing the sensitivity of the proximity sensor 282 may include increasing the level of power emitted by the proximity sensor 282, and decreasing the sensitivity of the proximity sensor 282 may include decreasing the level of power emitted by the proximity sensor 282.

Furthermore, in at least some example embodiments, by varying the sensitivity of the proximity sensor 282, the threshold associated with a determination whether an object is present or not may be varied. As the threshold may include a level of change of the electromagnetic field or reflected electromagnetic radiation to detect the presence of the object, and/or a length of time to detect the presence of the object, increasing the sensitivity of the proximity sensor 282 may decrease the required level of change of the electromagnetic field or reflected electromagnetic radiation to detect the object and/or decrease the required length of time to detect the presence of the object. Similarly, decreasing the sensitivity of the proximity sensor 282 may increase the required level of change of the electromagnetic field or reflected electromagnetic radiation to detect the object and/or increase the required length of time to detect the presence of the object. That is, an increase to the threshold may be a decrease of the sensitivity while a decrease of the threshold may be an increase of the sensitivity.

As mentioned above, the relationship between the orientation of the electronic device (i.e. whether it is held on the left side 312 or the right side 314 of the head 310) and the corresponding adjustments to the sensitivity of the proximity sensor 282 will depend on the longitudinal side 110, 112 (FIG. 1) that is nearest the proximity sensor 282.

By appropriately adjusting the sensitivity of the proximity sensor 282, the sensor control module 226 may optimize operation of the proximity sensor 282 based on changes in the orientation of the electronic device 201.

In at least some example embodiments, the sensor control module 226 may further obtain sensor data from the adjusted proximity sensor 282, and detect a head 310 based on the obtained sensor data. For example, the adjusted proximity sensor 282 may obtain sensor data defining the presence of a head 310 when the electronic device 201 is held tilted in close proximity to either the right side 314 of the head 310 or the left side 312 of the head 310 of the user. This sensor data is then analyzed by the sensor control module 226 to detect the presence of the head 310 of the user. In at least some example embodiments, in response to detecting the head 310, the sensor control module 226 may disable processing of instructions input, via the touchscreen display 204, to the electronic device 201. For example, the touchscreen display 204 may be deactivated (e.g. the overlay of the touchscreen display 204 may be deactivated) and/or the electronic device 201 is unresponsive to instructions input via the touchscreen display 204 (e.g. the sensor control module 226 may prevent the processing of the instructions). Accordingly, a user using the electronic device 201 for a phone call may not inadvertently cause the electronic device 201 to perform functions by accidently inputting instructions on the touchscreen display 204 (for example, by selecting displayed interface elements via contact with the touchscreen display 204 by the head 310, ear, cheek, or other body part) as processing of instructions input via the touchscreen display 204 is disabled.

Specific functions and features of the sensor control module 226 will be discussed in greater detail below with reference to FIG. 5.

In at least some example embodiments, the operating system 223 may perform some or all of the functions of the sensor control module 226. In other example embodiments, the functions or a portion of the functions of the sensor control module 226 may be performed by one or more other applications. For example, in at least some example embodiments, the determining of the orientation of the electronic device 201 and/or the adjusting of the sensitivity of the proximity sensor 282 functions may be performed by other applications.

Further, while the sensor control module 226 has been illustrated as a stand-alone application, in other example embodiments, the sensor control module 226 may be implemented as part of the operating system 223 or another application 225. Furthermore, in at least some example embodiments, the functions of the sensor control module 226 may be provided by a plurality of software modules. In at least some example embodiments, these software modules may be divided among multiple applications.

Additionally, in at least some example embodiments, the sensor control module 226 may not be stored in the flash memory 244, and may instead be stored in a memory associated with the proximity sensor 282. In such example embodiments, a controller of the proximity sensor 282 may execute the sensor control module 226 to perform all or some of the functions of the sensor control module 226 described herein. Moreover, in at least some example embodiments, one or more modules located in the flash memory 244 of the electronic device 201 may perform some of the functions of the sensor control module 226, while one or more modules located in a memory associated with the proximity sensor 282 may perform some of the functions of the sensor control module 226. Accordingly, a controller associated with the proximity sensor 282 may cause some or all of the functions of the sensor control module 226 to be performed instead of or in addition to the processor 240 of the electronic device 201.

Adjusting Sensitivity of Proximity Sensor

Figure 5:
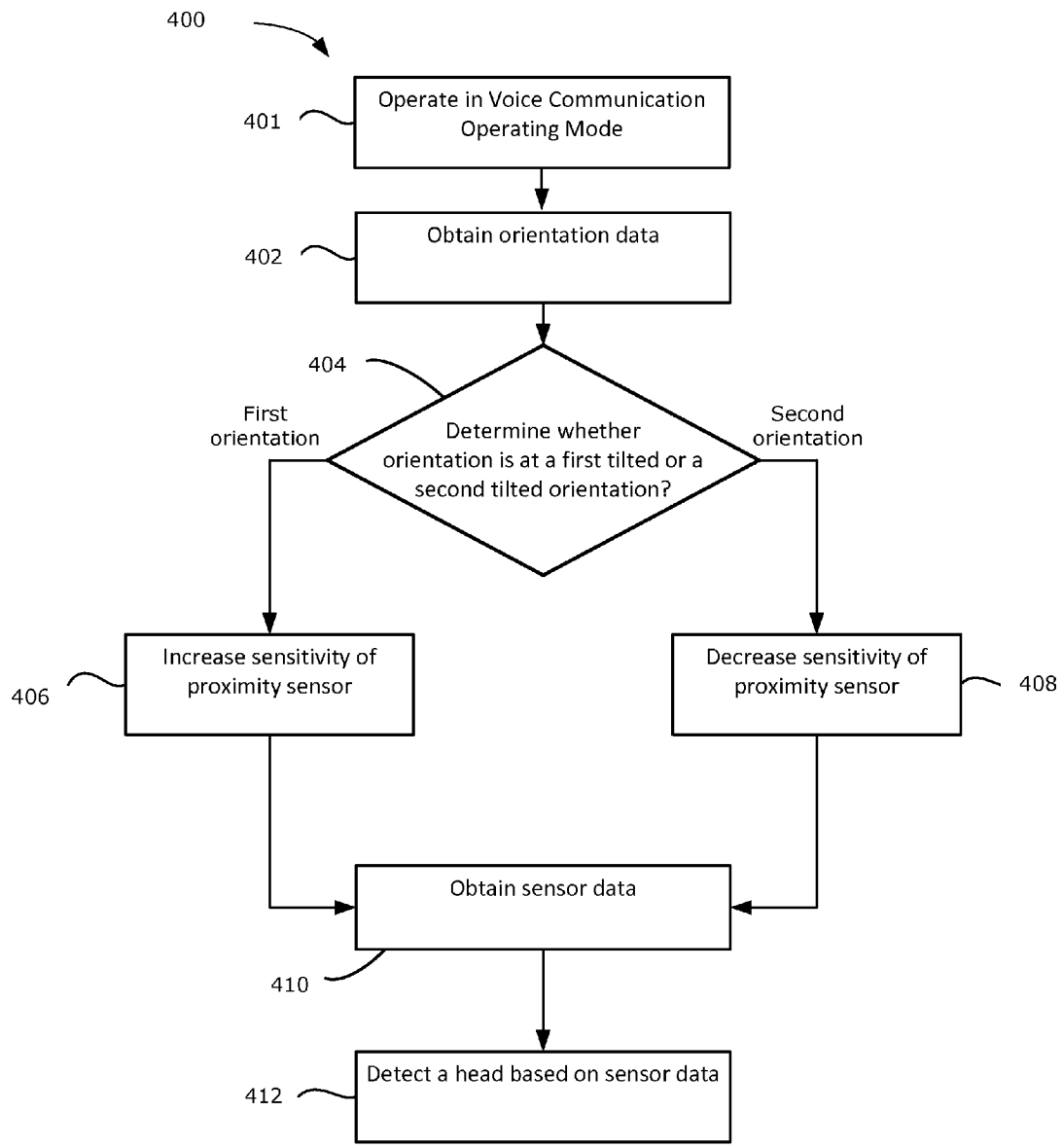
FIG. 5 is a flowchart illustrating an example method of adjusting sensitivity of a proximity sensor of the electronic device in accordance with example embodiments of the present disclosure.

Reference will now be made to FIG. 5, in which an example method 400 of adjusting sensitivity of the proximity sensor 282 of the electronic device 201 is illustrated in flowchart form. The electronic device 201 may be configured to perform the method 400 of FIG. 5. In at least some example embodiments, the processor 240 of the electronic device 201 is configured to perform the method 400 of FIG. 5. One or more applications 225 or modules on the electronic device 201 may contain computer readable instructions which cause the processor 240 of the electronic device 201 to perform the method 400 of FIG. 5. In at least some example embodiments, the sensor control module 226 stored in memory of the electronic device 201 is configured to perform the method 400 of FIG. 5. More particularly, the sensor control module 226 may contain computer readable instructions which, when executed, cause the processor 240 to perform the method 400 of FIG. 5. In at least some example embodiments, the sensor control module 226 may interface with other components, such as the orientation sensor 280 and the proximity sensor 282 to perform the method of 400 of FIG. 5.

It will be appreciated that the method 400 of FIG. 5 may, in at least some example embodiments, be provided by other software applications or modules apart from those specifically discussed above. Accordingly, any features which are referred to as being performed by the electronic device 201 may be performed by any one or more of the software applications or modules referred to above or other software modules. In at least some example embodiments, at least some of the method 400 of FIG. 5 may be performed by or may rely on other applications or modules.

The method 400 includes, at 401, operating in a voice communication operating mode. The voice communication operating mode is an operating mode in which the electronic device 201 is used for voice communications. The voice communication operating mode is a handset operating mode in which a microphone and speaker associated with the electronic device 201 are configured for use within close proximity to a mouth and ear of a user respectively. This may be contrasted with a speakerphone mode in which the microphone and speaker may be configured to use over much greater distances. The voice communication operating mode may, for example, begin when the user initiates or receives a telephone call.

At 402 the method 400 includes obtaining orientation data from the associated orientation sensor 280. That is, the orientation sensor 280 generates orientation data that specifies the orientation of the electronic device 201 which is received by the electronic device 201. In at least some example embodiments, the orientation sensor 280 may directly detect the orientation of the electronic device 201. In at least some example embodiments, the orientation sensor 280 may generate information from which the orientation of the electronic device 201 can be determined.

After obtaining the orientation data, the electronic device 201, at 404, may determine whether the orientation of the electronic device 201 is at a first tilted orientation or a second tilted orientation based on the orientation data. That is, the electronic device 201 analyzes the received orientation data to determine if the orientation data specifies a first tilted orientation (which may be associated with a left side 312 of the head 310) or a second tilted orientation (which may be associated with a right side 314 of the head 310).

As mentioned above, the first tilted orientation and the second tilted orientation are orientations of the electronic device 201 when held tilted relative to the gravitational field of the earth. More particularly, the first tilted orientation and the second tilted orientation are tilted orientations of the electronic device 201 when typically held by a user against his/her ear during a phone call (i.e. the electronic device 201 is held by the rear side 104 with the front side 102 in contact or proximity with an ear of the user). In such example embodiments, the first tilted orientation may pertain to the orientations of the electronic device 201 when held against one ear of the user, and the second tilted orientation may pertain to the orientations of the electronic device 201 when held against the other ear of the user.

Accordingly, the electronic device 201 may determine whether the orientation is one associated with a left side 312 of the head 310 or the right side 314 of the head 310. This determination may be made by comparing the orientation of the electronic device to predetermined ranges of orientations. For example, a first range of orientations may be associated with a first side of the head 310 and a second range of orientations may be associated with a second side of the head 310. The first range includes the first tilted orientation and the second range includes the second tilted orientation.

In at least some embodiments, the determination of the orientation of the electronic device 201 (at 404) is performed in response to the initiation and/or receipt of a phone call. That is, the determination process may only occur during a phone call on the electronic device 201 i.e. while the device remains in the voice communication operating mode described with reference to 401.

At 406, if it is determined that the electronic device 201 is at the first tilted orientation, the sensitivity of the proximity sensor is increased. While, at 408, if it is determined that the electronic device 201 is at the second tilted orientation, the sensitivity of the proximity sensor is decreased. As such, the electronic device 201 may adjust the sensitivity of the proximity sensor 282 based on whether the orientation of the electronic device 201 is at the first tilted orientation or the second tilted orientation.

Methods of adjusting the sensitivity of the proximity sensor are described in greater detail above with reference to FIG. 4 and any one or more of these techniques may be used at 406 and/or 408.

At 410, the electronic device 201 may obtain sensor data from the proximity sensor 282. That is, the proximity sensor 282 generates sensor data that may specify the presence of an object in proximity to the electronic device 201 (i.e. within the sensing area of the proximity sensor 282). More particularly, the proximity sensor 282 may emit an electromagnetic field or electromagnetic radiation, and detect changes in the electromagnetic field or reflected electromagnetic radiation. This detected information may be generated in the form of sensor data that is received by the electronic device 201.

After obtaining the sensor data, the electronic device 201, at 412, may detect a head 310 based on the sensor data. For example, a user conventionally operating the electronic device 201 during a phone call, may place the electronic device 201 tilted against either the left side 312 of the head 310 or the right side 314 of the head 310. The head 310 of the user is within the sensing area of the proximity sensor 282, and may cause a change in the electromagnetic field or reflect electromagnetic radiation that is detected by the proximity sensor 282, and specified in generated sensor data. The electronic device 201 may then determine that the head 310 of the electronic device 201 is in proximity to the electronic device based on the generated sensor data.

In at least some example embodiments, in response to detecting the head 310, the electronic device 201 may disable processing of instructions input, via the touchscreen display 204, to the electronic device 201. That is, the electronic device 201 stops processing instructions input in to the electronic device 201 from the touchscreen display 204 upon detecting the presence of the head 310 of the user. For example, the touchscreen display 204 is deactivated and/or the electronic device 201 is unresponsive to gestures input on the touchscreen display 204. Accordingly, a user is not permitted to input instructions to the electronic device 201 when the head 310 of the user is detected in proximity to the electronic device 201. In such cases, a user may not inadvertently cause operations on the electronic device 201 by accidently inputting instructions (such as, by the ear, cheek, head 310, etc.) via the the touchscreen display 204 when conventionally holding the electronic device 201 against a side of the head 310 during a phone call, as the electronic device 201 is disabled from processing input instructions via the touchscreen display 204.

Additionally, in such example embodiments, the electronic device 201 may be re-enabled (i.e. no longer disabled) to process instructions input via the touchscreen display 204, when the head 310 of the user is no longer detected. That is, the proximity sensor 282 may no longer detect the presence of an object in proximity to the electronic device 201 (for example, there are no longer any changes in the emitted electromagnetic field or receipt of electromagnetic radiation). In such cases, the electronic device 201 is re-enabled to process instructions input via the touchscreen display 204, and associated operations are performed by the electronic device 201. For example, a user conventionally holding the electronic device 201 against a side of the head 310 during phone call and in which case the electronic device 201 is disabled for processing of input instructions, may move the electronic device 201 away from the head 310 to perform functions and features on the electronic device 201 (for example, to select a number on a virtual keypad displayed on the touchscreen display 204 to input an associated response during an automated phone call). In such cases, the electronic device 201 may be re-enabled so that instructions input by the user may be processed.

While the present application is primarily described in terms of methods, a person of ordinary skill in the art will understand that the present application is also directed to various apparatus such as an electronic device 201 including a mobile communications device. The electronic device 201 includes components for performing at least some of the aspects and features of the described methods, which may be by way of hardware components (such as the memory 244 and/or the processor 240), software or any combination of the two, or in any other manner. Moreover, an article of manufacture for use with the apparatus, such as a prerecorded storage device or other similar computer readable medium including program instructions recorded thereon may direct an apparatus to facilitate the practice of the described methods. It is understood that such apparatus and articles of manufacture also come within the scope of the present application.

The term "computer readable medium" as used herein means any medium which can store instructions for use by or execution by a computer or other computing device including, but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile Disc (DVD) or Blu-Ray™ Disc, and a solid state storage device (e.g., NAND flash or synchronous dynamic RAM (SDRAM)).

Example embodiments of the present application are not limited to any particular operating system, system architecture, mobile device architecture, server architecture, or computer programming language.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A method implemented by a processor of an electronic device for adjusting sensitivity of an associated proximity sensor, the proximity sensor positioned to detect objects on a front side of the electronic device and the proximity sensor is positioned biased towards a longitudinal side of the electronic device, the electronic device having an orientation sensor for generating orientation data based on an orientation of the electronic device, the method comprising:
   obtaining orientation data from the orientation sensor;
   based on the orientation data, determining whether the electronic device is at a first tilted orientation or a second tilted orientation, and wherein the first tilted orientation is associated with the proximity sensor being aligned with a first user head feature, and wherein the second tilted orientation is associated with the proximity sensor being aligned with a second user head feature, and wherein a first gap between the proximity sensor and the first user head feature is larger than a second gap between the proximity sensor and the second head feature; and
   adjusting the sensitivity of the proximity sensor based on whether the electronic device is at the first tilted orientation or the second tilted orientation, and wherein adjusting the sensitivity includes:
      when the orientation of the electronic device is at the first tilted orientation associated with a first side of a user's head, increasing the sensitivity of the proximity sensor to accommodate the first gap between the proximity sensor and the first user head feature that is larger than the second gap between the proximity sensor and the second user head feature when the electronic device is held at a second side of the user's head; and
      when the orientation of the electronic device is at the second tilted orientation associated with the second side of the head, decreasing the sensitivity of the proximity sensor.

2. The method of claim 1, wherein the longitudinal side is a right longitudinal side of a front side of the electronic device, and wherein the electronic device is in closer proximity to a left side of the head at the first tilted orientation.

3. The method of claim 1, wherein the longitudinal side is a left longitudinal side of a front side of the electronic device, and wherein the electronic device is in closer proximity to a right side of the head at the first tilted orientation.

4. The method of claim 1, further comprising:
obtaining sensor data from the proximity sensor; and
detecting the head based on the sensor data.

5. The method of claim 4, further comprising in response to detecting the head, disabling processing of instructions input, via a touchscreen display, to the electronic device.

6. The method of claim 1, wherein the first tilted orientation is within a predetermined range of orientations associated with the first side of the head.

7. The method of claim 1, wherein increasing the sensitivity of the proximity sensor includes increasing the range of the proximity sensor to detect an object.

8. The method of claim 1, wherein increasing the sensitivity of the proximity sensor includes increasing the level of power of the proximity sensor.

9. The method of claim 1, wherein the electronic device is a mobile communication device, the method further comprising initiating a phone call on the mobile communication device, and wherein increasing the sensitivity of the proximity sensor is performed in response to initiating the phone call.

10. The method of claim 1, wherein the orientation sensor is any one of an accelerometer or a gyroscope.

11. An electronic device comprising:
a proximity sensor positioned biased towards a longitudinal side of the electronic device and positioned to detect objects on a front side of the electronic device;
an orientation sensor for generating orientation data based on an orientation of the electronic device;
a memory; and
a processor coupled with the proximity sensor, the orientation sensor, and the memory, the processor configured to:
obtain orientation data from the orientation sensor;
based on the orientation data, determine whether the electronic device is at a first tilted orientation or a second tilted orientation, and wherein the first tilted orientation is associated with the proximity sensor being aligned with a first user head feature, and wherein the second tilted orientation is associated with the proximity sensor being aligned with a second user head feature, and wherein a first gap between the proximity sensor and the first user head feature is larger than a second gap between the proximity sensor and the second head feature; and
adjust the sensitivity of the proximity sensor based on whether the electronic device is at the first tilted orientation or the second tilted orientation, and wherein adjusting the sensitivity includes:
when the orientation of the electronic device is at the first tilted orientation associated with a first side of a user's head, increase the sensitivity of the proximity sensor to accommodate the first gap between the proximity sensor and the first user head feature that is larger than the second gap between the proximity sensor and the second user head feature when the electronic device is held at a second side of the user's head; and when the orientation of the electronic device is at the second titled tilted orientation associated with the second side of the head, decrease the sensitivity of the proximity sensor.

12. The electronic device of claim 11, wherein the longitudinal side is a right longitudinal side of a front side of the electronic device, and wherein the electronic device is in closer proximity to a left side of the head at the first tilted orientation.

13. The electronic device of claim 11, wherein the longitudinal side is a left longitudinal side of a front side of the electronic device, and wherein the electronic device is in closer proximity to a right side of the head at the first tilted orientation.

14. The electronic device of claim 11, wherein the processor is further configured to:
obtain sensor data from the proximity sensor; and
detect the head based on the sensor data.

15. The electronic device of claim 14, further comprising a touchscreen display and wherein the processor is further configured to, in response to detecting the head, disable processing of instructions input, via the touchscreen display, to the electronic device.

16. The electronic device of claim 11, wherein the first tilted orientation is within a predetermined range of orientations associated with the first side of the head.

17. The electronic device of claim 11, wherein increasing the sensitivity of the proximity sensor includes increasing the range of the proximity sensor to detect an object.

18. A non-transitory computer readable storage medium comprising computer executable instructions which, when executed, configure a processor of an electronic device having a proximity sensor positioned to detect objects on a front side of the electronic device, the proximity sensor positioned biased towards a longitudinal side of the electronic device and an orientation sensor for generating orientation data based on an orientation of the electronic device, to:
obtain orientation data from the orientation sensor;
based on the orientation data, determine whether the electronic device is at a first tilted orientation or a second tilted orientation, and wherein the first tilted orientation is associated with the proximity sensor being aligned with a first user head feature, and wherein the second tilted orientation is associated with the proximity sensor being aligned with a second user head feature, and wherein a first gap between the proximity sensor and the first user head feature is larger than a second gap between the proximity sensor and the second head feature; and
adjust the sensitivity of the proximity sensor based on whether the electronic device is at the first tilted orientation or the second tilted orientation, and wherein adjusting the sensitivity includes:
when the orientation of the electronic device is at the first tilted orientation associated with a first side of a user's head, increase the sensitivity of the proximity sensor to accommodate the first gap between the proximity sensor and the first user head feature that is larger than the second gap between the proximity sensor and the second user head feature when the electronic device is held at a second side of the user's head; and
when the orientation of the electronic device is at the second tilted orientation associated with the second side of the head, decrease the sensitivity of the proximity sensor.

* * * * *